United States Patent [19]
Ullrich

[11] 4,162,854
[45] * Jul. 31, 1979

[54] MULTI-SHAFT SCREW EXTRUDER

[75] Inventor: Martin Ullrich, Leverkusen, Fed. Rep. of Germany

[73] Assignee: Bayer Aktiengesellschaft, Leverkusen, Fed. Rep. of Germany

[*] Notice: The portion of the term of this patent subsequent to Aug. 9, 1994, has been disclaimed.

[21] Appl. No.: 773,871

[22] Filed: Mar. 2, 1977

[30] Foreign Application Priority Data

Mar. 20, 1976 [DE] Fed. Rep. of Germany ....... 2611908

[51] Int. Cl.$^2$ ................................................ B29B 1/10
[52] U.S. Cl. ................................................ 366/83
[58] Field of Search ....................... 259/192, 104, 6, 5; 366/83, 84, 85

[56] References Cited
U.S. PATENT DOCUMENTS

| | | | |
|---|---|---|---|
| 2,508,495 | 5/1950 | Consalvo | 259/192 |
| 3,254,367 | 6/1966 | Erdmenger | 259/192 |
| 4,040,607 | 8/1977 | Ullrich | 425/204 |

*Primary Examiner*—Robert W. Jenkins
*Attorney, Agent, or Firm*—Sprung, Felfe, Horn, Lynch & Kramer

[57] ABSTRACT

The screw extruder is provided with screw shafts arranged so as to intermesh in pairs and rotate in pairs in the same sense, each screw shaft of a pair containing at least one double or triple threaded pressure build-up section corresponding to that of the other screw shaft. At least part of the pressure build-up sections have at least a ratio of screw pitch t to housing inner diameter d within the range:

$0.7 \cdot f(h/d, \delta/d, q/nd^3) < t/d < 1.8 \cdot f(h/d, \delta/d, q/nd)$ in which q is the volume throughput of one screw pair, n is the screw shaft rotational speed, h is the thread depth, measured from the screw thread base to the housing inner wall, $\delta$ is the radial screw clearance between the screw crest and the housing inner wall and f is a function between the above values which is specified in the description.

2 Claims, 8 Drawing Figures

MULTI-SHAFT SCREW EXTRUDER

The present invention relates to multi-shaft screw extruders with screw shafts arranged so as to intermesh in pairs and rotate in pairs in the same sense, of which each screw shaft of a pair has at least one double or triple threaded pressure build-up section corresponding to that of the other screw shafts.

U.S. Pat. No. 4,040,607 such a screw extruder may be optimised in terms of geometry and energy requirements by the pressure build-up sections being provided at least partially with a relative screw pitch t/d lying in the region of a mathematical equation specified therein. This specified equation depends only on the throughput coefficient $q/nd^3$. In addition to this quantitive relationship, the description of this document specifies qualitatively which t/d values from a given optimisation area are valid at different relative thread depths h/d. Although indicated, this dependency on the thread depth is not specified quantitatively. It is not stated whether the relative screw clearance $\delta/d$ has an influence on the optimum pitch.

The object of the present invention is a further improvement of the optimisation of the screw extruder taking into account the influence of the relative screw clearance $\delta/d$.

The object of the present invention is achieved by at least part of the pressure build-up sections having a ratio of screw pitch t to housing internal diameter d which lies within the region of the following relationship:

$0.7 \cdot f(h/d, \delta/d, q/nd^3) < t/d < 1.8 \cdot f(h/d, \delta/d, q/nd^3)$, where q is the volumetric throughput of a srew pair, n is the screw shaft rotational speed, h is the thread depth, measured from the screw thread base to the housing inner wall and $\delta$ is the radial screw clearance between the screw crest and the housing inner wall and in which:

$$f\left(\frac{h}{d}, \frac{\delta}{d}, \frac{q}{nd^3}\right) = \frac{A}{\frac{h}{d}} \cdot \left[a + b \cdot \frac{q}{nd^3} + c \cdot \left(\frac{q}{nd^3}\right)^2\right]$$

and $a = a_0 + b_0 \cdot (\delta/d) + c_0 \cdot (\delta/d)^2 + d_0 \cdot (\delta/d)^3$ $b = a_1 + b_1 \cdot (\delta/d) + c_1 \cdot (\delta/d)^2 + d_1 \cdot (\delta/d)^3$ $c = a_2 + b_2 \cdot (\delta/d) + c_2 \cdot (\delta/d)^2 + d_2 \cdot (\delta/d)^3$ in which in the case of triple-threaded prssure build-up sections A=0.1082

| | | | |
|---|---|---|---|
| $a_0 = 0.18173$ | $b_0 = -9.9396$ | $c_0 = 3926.6$ | $d_0 = -122\,604$ |
| $a_1 = 8.2230$ | $b_1 = 170.46$ | $c_1 = -10\,833$ | $d_1 = 219\,048$ |
| $a_2 = 4.8033$ | $b_2 = 1053.6$ | $c_2 = -80\,154$ | $d_2 = 1\,793\,827$ | and in which in the case of double pitch pressure build-up sections A=0.206

| | | | |
|---|---|---|---|
| $a_0 = 0.18173$ | $b_0 = -4.970$ | $c_0 = 981.65$ | $d_0 = -15\,325$ |
| $a_1 = 5.1394$ | $b_1 = 53.267$ | $c_1 = -1692.6$ | $d_1 = 17\,113$ |
| $a_2 = 1.8763$ | $b_2 = 205.78$ | $c_2 = 7827.6$ | $d_2 = 87\,589$ | and in which the following expressions are valid:

$f(h/d, \delta/d, q/nd^3) < 2.0$; $q/nd^3 > 0.01$;
$0.0015 < \delta d < 0.02$;

$0.06 < (h/d)$ triple-threaded $< 0.13$ and $0.11$ $(h/d)$ double threaded $< 0.29$.

According to a particular embodiment of the present invention, at least part of the pressure build-up sections have the smallest relative radial screw clearance $\delta/d$ permitted by the accuracy of manufacturing technology and the material between the screw crest and the housing inner wall, but greater than 0.0015 and the smallest permissible relative clearance s/d of the two screw shafts of one screw shaft pair in relation to one another, but greater than 0.003, in relation in each case to the housing internal diameter d.

The relationship $f(q/nd^3)$ given in the above mentioned prior patent application was found by experimenting on a triple threaded two shaft screw extruder having a relative radial screw clearance $\delta/d$ of $4.214 \cdot 10^{-3}$ ($\delta = 0.225$ mm, $d = 53.4$ mm). Therefore according to the new recognition of the present invention, the relationship $f(q/nd^3)$ from the prior patent application is only valid for a limited clearance range $\delta/d$ of approximately $2 \cdot 10^{-3}$ to $6 \cdot 10^{-3}$, but not for all screw clearances $\delta/d$ usual in practice.

Universal validity for all relative screw clearances $\delta/d$ occurring in practice and also for all relative thread depths h/d usual in practice is achieved only in the present solution according to the invention $f(h/d, \delta/d, q/nd^3)$. It has been found that there exists a clear dependency of the optimum pitch t/d in relation to the housing internal diameter on the relative radial screw clearance $\delta/d$ between the screw crest and the hosing inner wall.

The relative clearance of the two screw shafts of a screw shaft pair in relation to one another s/d, thus between the screw crest of one screw shaft and the screw thread base of the other screw shaft is usually varied according to the requirements of the extruder materials and the accuracy of manufacturing technology at the same time as the relative radial screw clearance $\delta/d$ according to the following equation $s/d = x \cdot \delta/d$, with the factor x being from 1 to 3. Thus, insofar as this specified relationship of s and $\delta$ is observed, the influence of the relative clearance s/d between the two screw shafts is also contained in the above relationship $f(h/d, \delta/d, q/nd^3)$ in the influence of the relative radial screw clearance $\delta$ and therefore does not appear separately in the specified relationships.

FIGS. 3 to 6 refer only to Examples 1 to 5.

Figure 1:
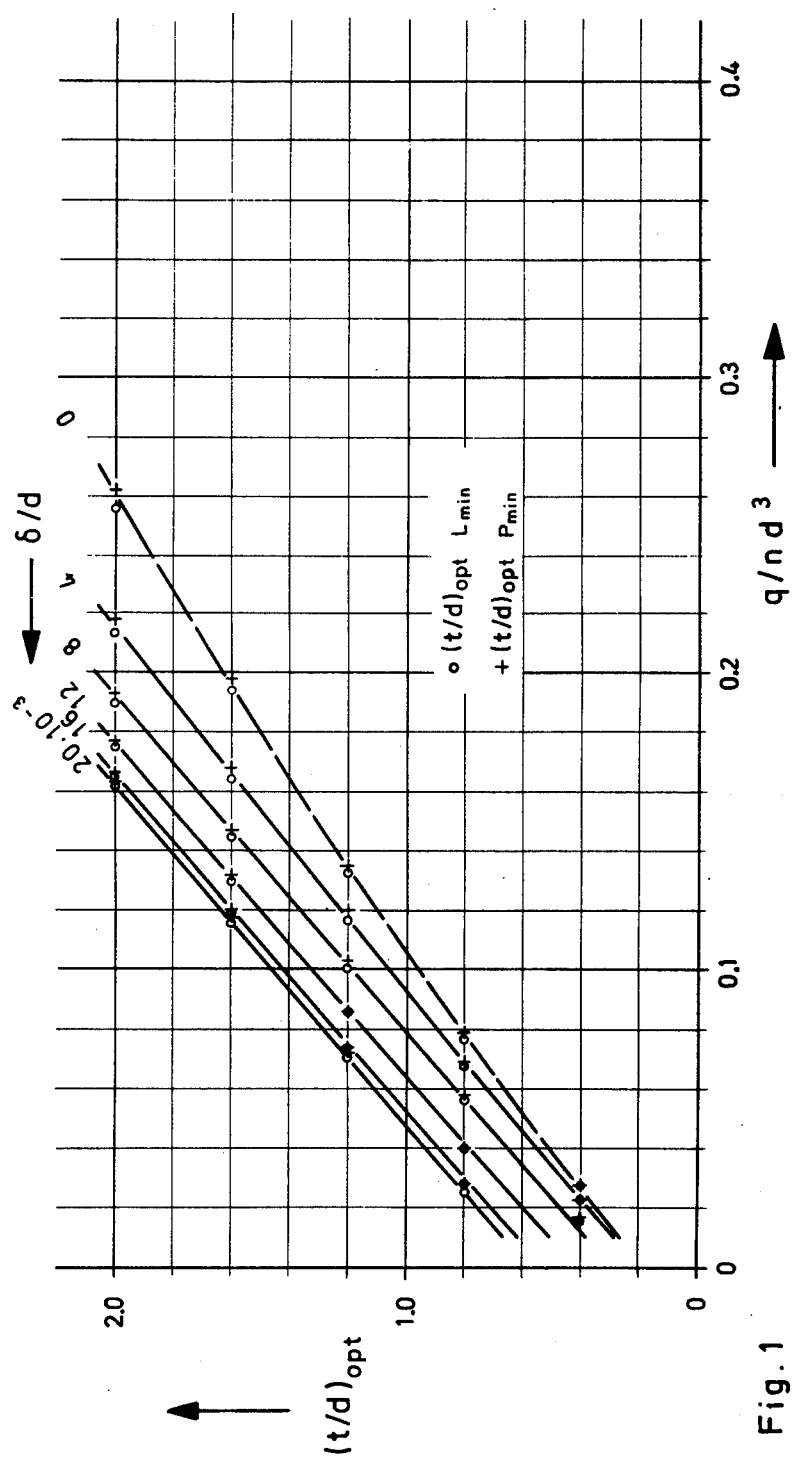
FIG. 1 shows the optimum pitch t/d of a triple threaded screw extruder with $h/d = 0.1082$ taking into account the relative radial screw clearance $\delta/d$.

It has been found that for all clearances in general practice, there is the minimisation of geometry and energy consumption, thus questions as to the smallest pressure build-up length and the smallest drive power and thus as to the lowest material stress lead to practically the same optimum pitch. This is shown in FIG. 1. The investigations here extend in addition to the inclusion of the relative radial screw clearance $\delta/d$ also to the extremes of small and large throughput coefficients $q/nd^3$ and are therefore more comprehensive and more accurate than the results of the above mentioned prior patent application.

Figure 2:
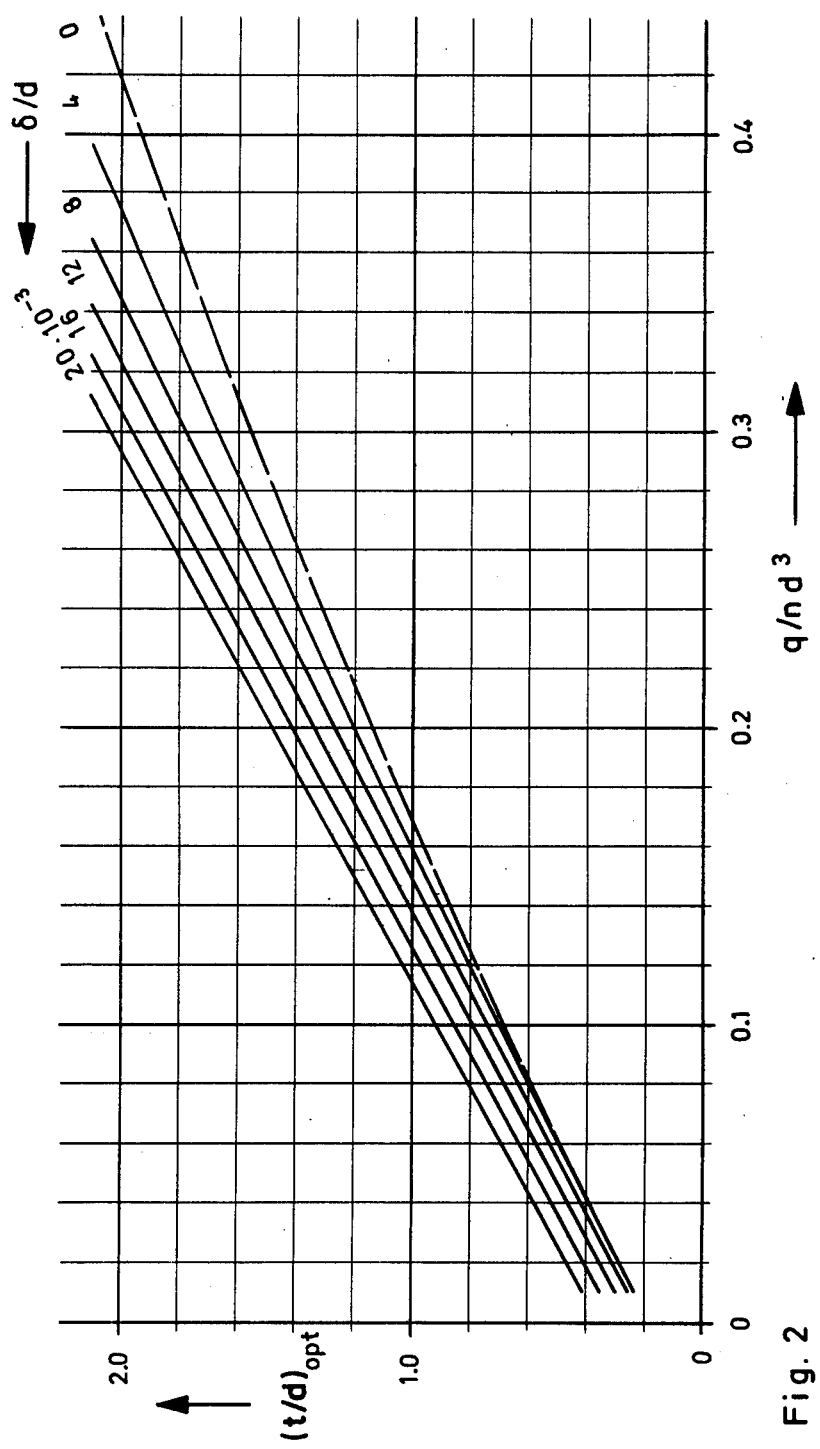
FIG. 2 shows the optimum pitch t/d of a double threaded screw extruder with $h/d = 0.206$ taking into account the relative radial screw clearance $\delta/d$.

FIG. 2 shows the solution according to the invention for a double threaded two shaft screw extruder with a relative thread depth $h/d$ of 0.206 for all clearances usual in practice.

The unified solution both for the geometrical and for the energy aspects is given for all pitches, clearances, thread depths and throughput coefficients occurring in practice in the form of the following equation:

$$(t/d)_{opt} = \frac{A}{\frac{h}{d}} \cdot \left[ a + b \cdot \frac{q}{nd^3} + c \cdot (\frac{q}{nd^3})^2 \right],$$

in which the individual numerical values of A, a, b, c are given above.

In practice, certain standarised graduated values must be observed in pitch optimisation, so that not any numerical value determined according to the above equation for t can be realised. Thus the range fixed by the following equation for the pitch optimisation is given:
$0.7 \cdot f(h/d, \delta/d, q/nd^3) < t/d < 1.8 \cdot f(h/d, \delta/d, q/nd^3)$ This optimisation range is asymmetrical since, as shown in the Examples and in FIGS. 3 and 4, the pressure build-up length and the drive power increase more strongly than the optimum pitch for smaller pitches than for larger pitches.

In addition to the pitch optimisation mentioned, a further saving in pressure build-up length and drive power and material stress is achieved also by clearance optimisation, by providing at least part of the pressure build-up sections with the smallest relative radial screw clearance $\delta/d$ permitted by the accuracy of manufacturing technology and the materials between the screw crest and housing inner wall, although greater than 0.0015 and smallest permissible relative clearance $s/d$ of the two screw shafts of a screw shaft pair in relation to one another, although greater than 0.003, in each case relative to the housing internal diameter d.

Thus in the pressure build-up sections the smallest clearance which can be produced in each case with justifiable cost but a clearance above the specified limit values, is optimum in the sense of the present task. This additionally found result was not foreseeable and is surprising insofar as for the specified multi-shaft screw extruders hitherto the opinion obtained was that the screw clearances should be determined and selected as necessary from case to case with varying values depending on the material.

For the optimum design of a pressure build-up section it is therefore necessary to proceed as follows: First select the smallest clearance $\delta/d$ which can be produced by the accuracy of manufacturing technology and the materials with in each a predetermined justifiable cost. For example in the case of hardened steel screws this can be $\delta/d = 3 \times 10^{-3}$, in the case of relatively "soft" screws of chrome nickel steel $\delta/d = 10 \times 10^{-3}$. Then determine according to the above equation the optimum pitch $t/d$ relevant to this smallest permissible optimum clearance $\delta/d$.

It has in addition been found that this clearance optimisation i.e. the reduction of the clearance only to the specified limit values is advisable since the reduction of the clearance right to the limit values no longer produces savings in pressure build-up lengths and energy which justify the complexity. This is also shown in the Examples and in FIGS. 5 and 6.

The application and the working out of the solution according to the invention are shown in the following Examples. The validity of the solution according to the invention is proved on screw extruders of greatly varying sizes and also with greatly varying viscosities and temperatures.

EXAMPLE 1

With a two shaft screw extruder having intermeshing triple threaded screw shafts rotating in the same sense and having a housing internal diameter of 53.4 mm, an axial distance of the two screw shafts a of 48.01 mm, a thread depth h of 5.78 mm (measured from the screw thread base to the housing internal diameter), therefore a ratio $h/d$ of 0.1082, having a radial screw clearance $\delta$ between screw crest and housing inner wall of 0.9 mm, thus a ratio $\delta/d$ of $16.86 \cdot 10^{-3}$, and a clearance s of the two screw shafts in relation to one another, thus between the screw crest of the one and the screw thread base of the other screw shaft of 1.285 mm, thus a ratio $s/d$ of $24.06 \cdot 10^{-3}$, it is intended that silicon oil having a viscosity $\eta$ of 104 Poise at 20° C. be pumped in a volume flow q of 36.5 l/h at a screw shaft rotational speed of $n = 100$ rpm against a pressure differential $\Delta p$ of 3 bars. The pressure build-up length L and the drive power P should in this arrangement be minimised on the basis of the optimum ratio $t/d$.

The dimensionless throughput coefficient $q/nd^3$ is here 0.04. Thus there results from FIG. 1 or by means of the above relationship f a relative screw pitch $(t/d)_{opt}$ optimum for this operating state of 0.895, thus an optimum screw pitch $t_{opt}$ of 48mm. With the available screw pitches t of 30, 45, 60 and 90mm the pumping task set was achieved with the pressure build-up length L and drive power P given in the following table:

| Screw pitch | t [mm] | 30 | 60 | 60 | 90 |
|---|---|---|---|---|---|
| pressure build-up length | L [mm] | 510 | 340 | 340 | 430 |
| drive power | P [mm] | 104 | 69 | 68 | 83 |

Figure 3:
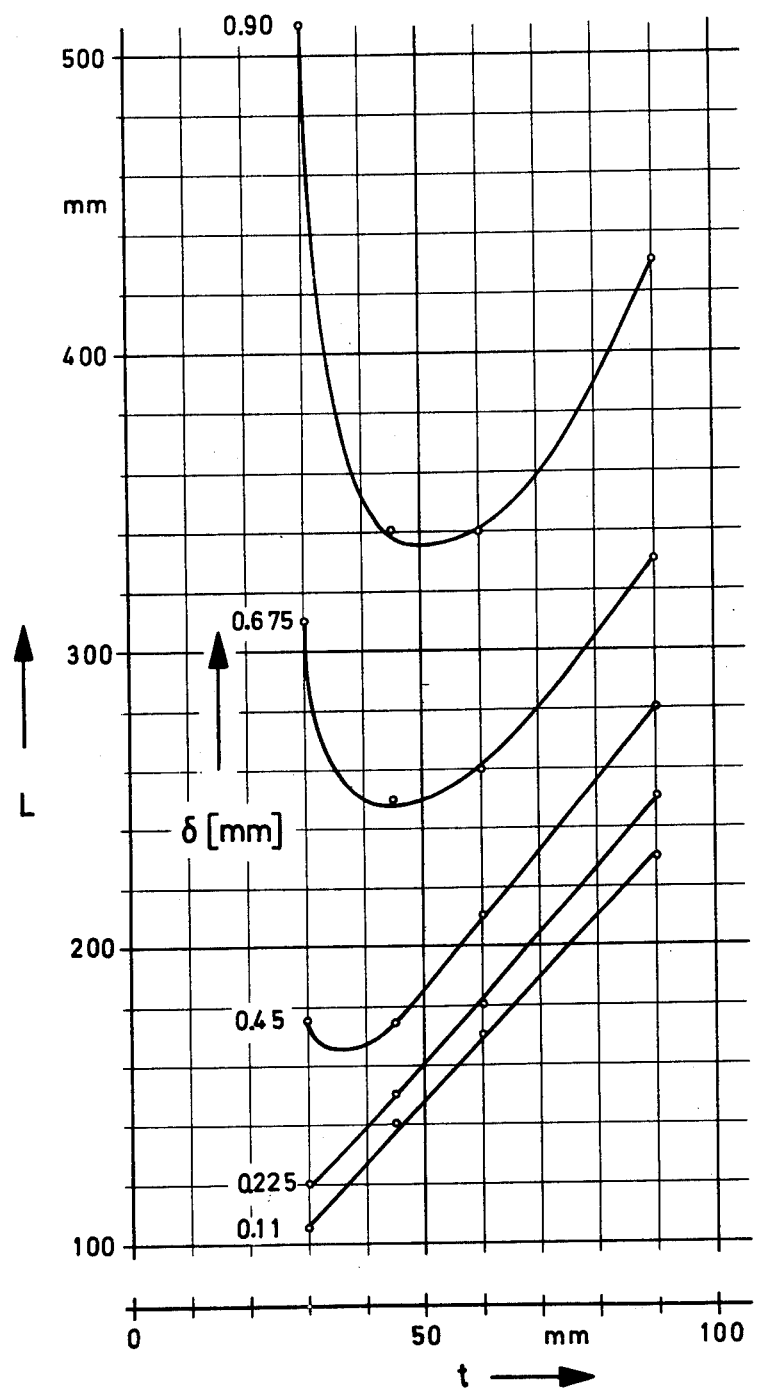
FIG. 3 shows the pressure build-up length L as a function of the pitch t.
Figure 4:
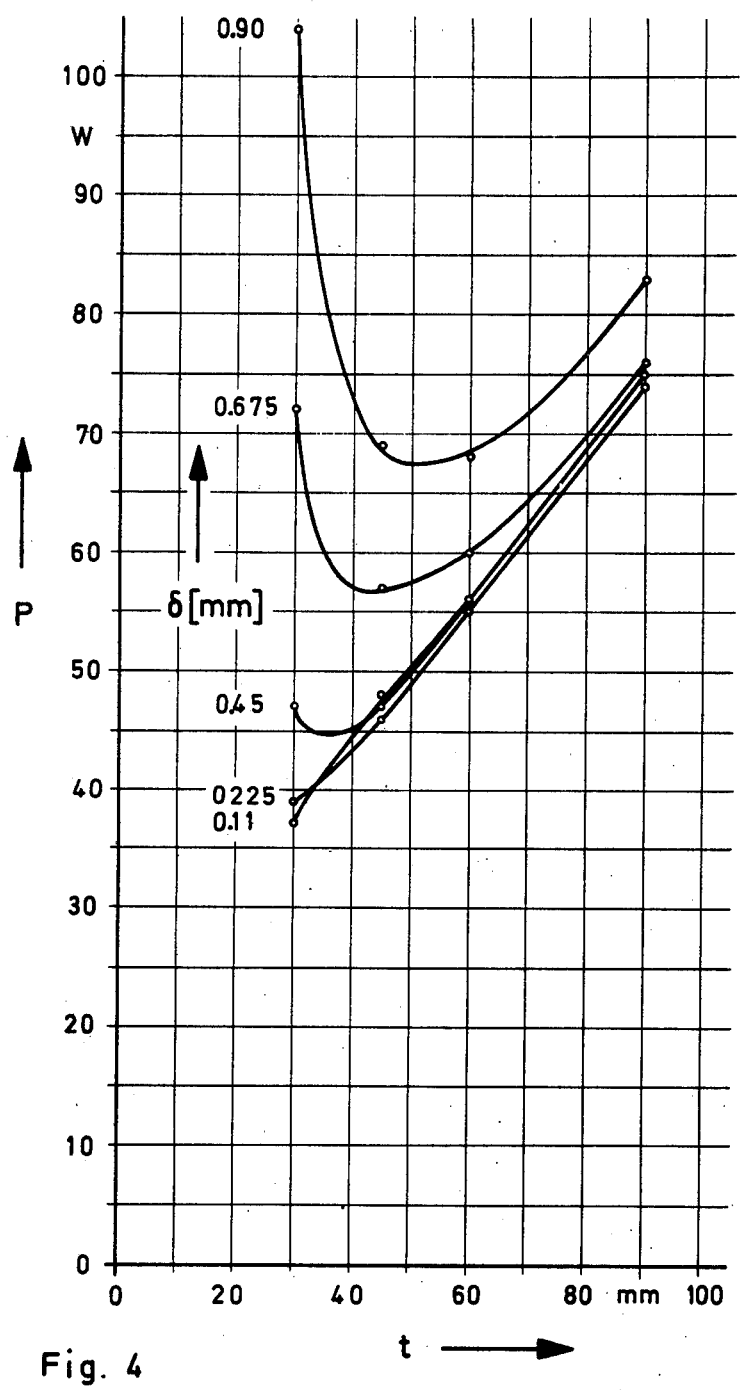
FIG. 4 shows the drive power P as a function of the pitch t.
Figure 5:
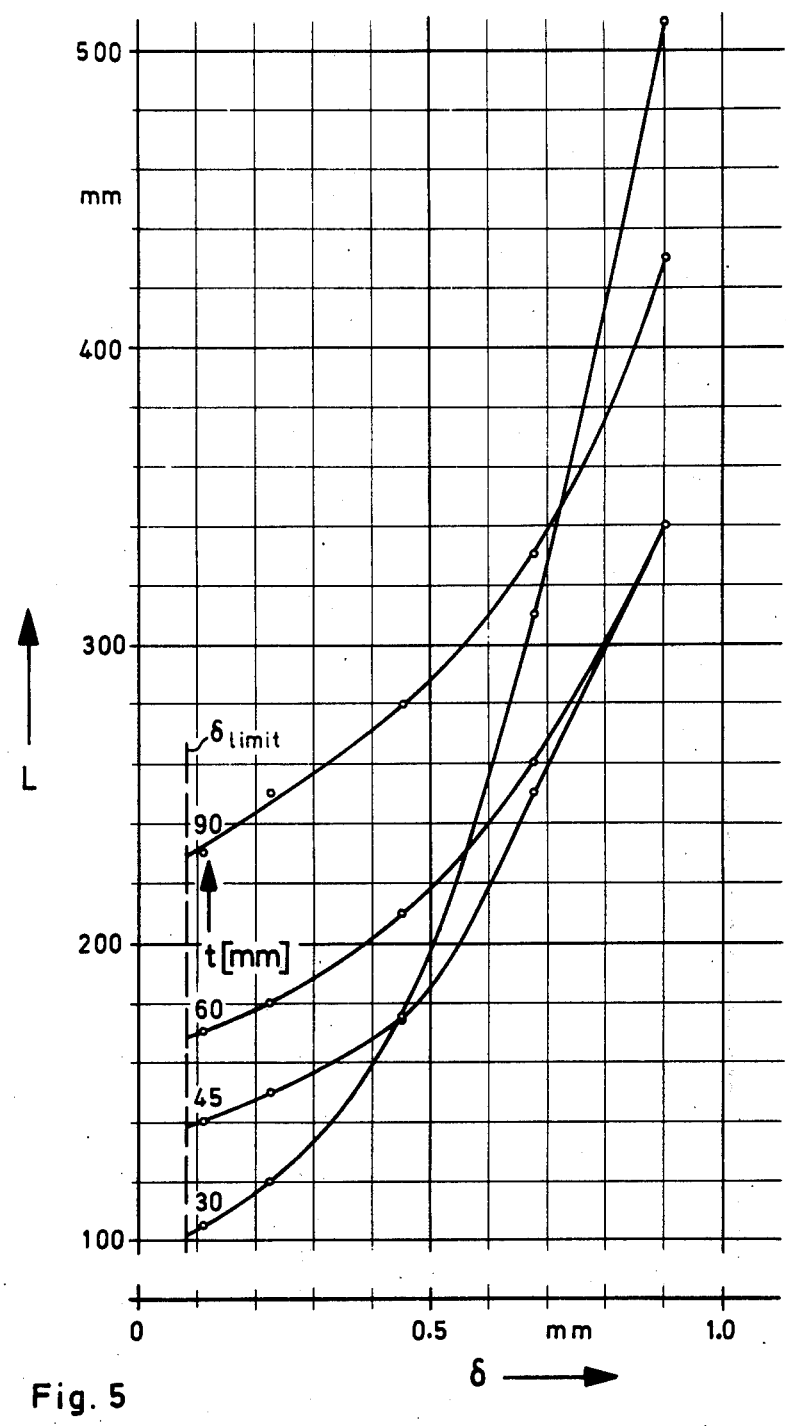
FIG. 5 shows the pressure build-up length L as a function of the radial screw clearance $\delta$.
Figure 6:
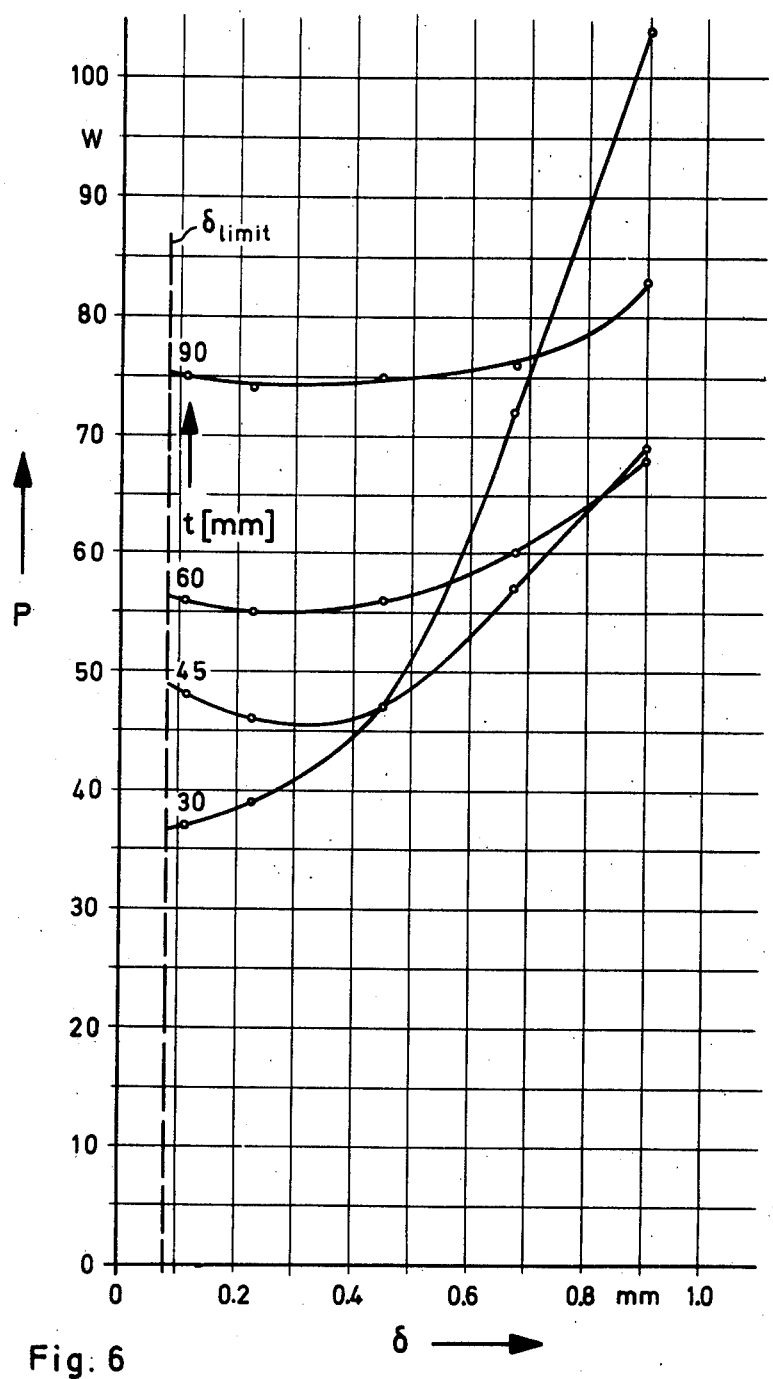
FIG. 6 shows the drive power P as a function of the radial screw clearance $\delta$.
Figure 8:
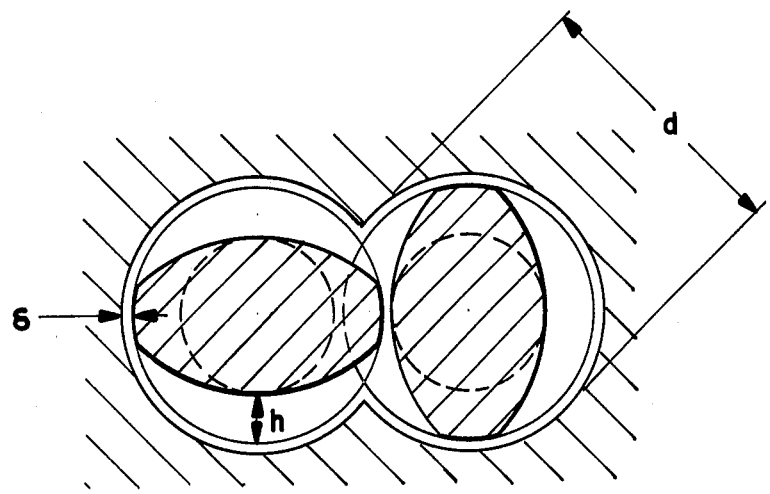
FIG. 8 shows a cross-section of the double thread, double screw extruder of FIG. 7.
Figure 7:
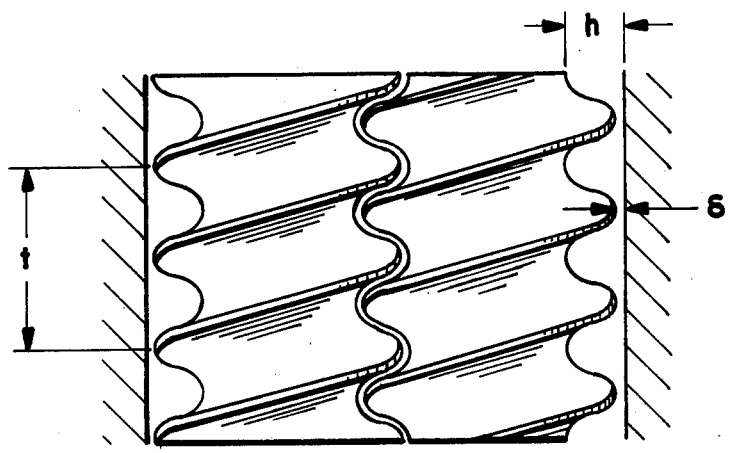
FIG. 7 shows a longitudinal section of a double thread, double screw extruder.

These measurement values as plotted in graph form in FIGS. 3 and 4 against the screw pitch, show clearly the minima of pressure build-up length L and drive power P between the pitches 45 and 60mm. In the case of the use of other otherwise entirely conventional pitches, up to 50% more pressure build-up length and up to 53% more drive power is required.

EXAMPLE 2

The pumping task specified in Example 1 is to be achieved with the two shaft screw extruder described in Example 1 but in this case with reduced clearances $\delta = 0.675$ mm, therefore $\delta/d = 12.64 \times 10^{-3}$ and $s = 1.06$ mm, therefore $s/d = 19.85 \times 10^{-3}$.

There then results from FIG. 1 or by means of the above relationship f an optimum relative screw pitch $(t/d)_{opt}$ of 0.79, therefore an optimum screw pitch $t_{opt}$ of 42mm. The experiments with the available set of screw pitches had the following results:

| Screw pitch | t [mm] | 30 | 45 | 60 | 90 |
|---|---|---|---|---|---|
| pressure build-up length | L [mm] | 310 | 250 | 260 | 330 |
| drive power | P [W] | 72 | 57 | 60 | 76 |

From the table and from FIGS. 3 and 4 it becomes clear firstly that the minima for L and P with the reduced clearance are not distinctly lower and secondly are displaced to the left to the smaller pitch value 42mm (Example 1: 48mm). In the case of the use of entirely conventional but here not optimum pitches, up to 32% more pressure build-up length and up to 33% more drive power is required.

EXAMPLE 3

The pumping task discussed in Examples 1 and 2 is now to be achieved with still further reduced clearances of $\delta = 0.45$ mm, therefore $\delta/d = 8.427 \times 10^{-3}$ and $s = 0.835$ mm, therefore $s/d = 15.64 \times 10^{-3}$.

According to the invention there now results in optimum relative screw pitch $(t/d)_{opt}$ of 0.66, therefore an optimum screw pitch $t_{opt}$ of 35mm. The measurement result here is:

| Screw pitch | t [mm] | 30 | 45 | 60 | 90 |
|---|---|---|---|---|---|
| pressure build-up length | L [mm] | 175 | 174 | 210 | 280 |
| drive power | P [W] | 47 | 47 | 56 | 75 |

In comparison with Example 2, the table and FIGS. 3 and 4 show a further lateral displacement of the minima for L and P to the lower pitch value of 35mm and in particular the geometrical and energetic downward displacement. The use of conventional but for this case not optimum pitches results in up to 61% more pressure build-up length and up to 60% more drive power.

EXAMPLE 4

The pumping task discussed in the above Examples is now to be solved with further reduced clearances of $\delta = 0.225$ mm, therefore $\delta/d = 4.213 \times 10^{-3}$ and $s = 0.61$ mm, therefore $s/d = 11.42 \times 10^{-3}$.

According to the invention there is now produced an optimum relative screw pitch $(t/d)_{opt}$ of 0.55, thus an optimum screw pitch $t_{opt}$ of 29mm. The result of the experiment is as follows:

| Screw pitch | t [mm] | 30 | 45 | 60 | 90 |
|---|---|---|---|---|---|
| pressure build-up length | L [mm] | 120 | 150 | 180 | 250 |
| drive power | P [W] | 39 | 46 | 55 | 74 |

The table and FIGS. 3 and 4 show a further continuation of the two trends: displacement of the minima for L and P downwards and to the left to the lower pitch value 29mm. The use of conventional but here not optimum pitches results in up to 108% more pressure build-up length and up to 90% more drive power.

EXAMPLE 5

The pumping task discussed in the previous Examples is now to be achieved with a last clearance reduction to $\delta = 0.11$ mm, therefore $\delta/d = 2.06 \times 10^{-3}$ and $s = 0.495$ mm therefore $s/d = 9.27 \times 10^{-3}$.

According to the invention there now results an optimum relative screw pitch $(t/d)_{opt}$ of 0.524 therefore an optimum screw pitch $t_{opt}$ of 28mm. The result of the experiment is here as followes:

| Screw pitch | t [mm] | 30 | 45 | 60 | 90 |
|---|---|---|---|---|---|
| pressure build-up length | L [mm] | 105 | 140 | 170 | 230 |
| drive power | P [W] | 37 | 48 | 56 | 75 |

This table and FIGS. 3 and 4 do show a further continuation of the tendencies described, but now in the case of the already very small clearance $\delta/d$ of 0.002 no longer to the considerable extent as in the earlier clearance reductions. Thus the smallest pressure build-up length of the pitch sequence in comparison with Example 4 of 120mm drops only slightly to 105mm and the lowest drive power of 39W only slightly to 37W. The increasing complexity of a clearance reduction at already relatively low clearances thus brings hardly any use. But in this case also the use of the optimum pitch relevant to the particular clearance is very important. Other otherwise also conventional but here not optimum pitches show up to 119% more pressure build-up length and up to 130% more drive power.

Discussion of Examples 1 to 5:

The results of Examples 1 to 5 should now be considered together with reference to FIGS. 3 to 6, providing the following overall statement.

1. For each screw clearance, a pitch optimisation brings substantial savings in pressure build-up length and drive power and thus also in material stress (cf. FIGS. 3 and 4).

2. Each screw clearance has a different optimum pitch. The minima are displaced laterally (cf. FIGS. 3 and 4).

3. Pressure build-up length and drive power increase more strongly for smaller pitches than the optimum pitch, thus left of the minimum than for larger pitches, thus right of the minimum (cf. FIGS. 3 and 4).

4. A clearance reduction brings about a reduction of the pressure build-up length and driver power (cf. FIGS. 5 and 6). The following table can be used to illustrate this:

| Screw clearance $\delta$ | [mm] | 0.90 | 0.675 | 0.45 | 0.225 | 0.11 |
|---|---|---|---|---|---|---|
| minimum pressure build-up length L in each case at pitch optimisation | [mm] | 340 | 250 | 174 | 120 | 105 |
| reduction in comparison with previous case | [%] | — | 26 | 30 | 31 | 12 |
| minimum drive power P in each case at pitch optimisation | [W] | 68 | 57 | 47 | 39 | 37 |
| reduction in comparison with previous case | [%] | — | 16 | 18 | 17 | 5 |

5. On approaching the clearance limit value $\delta/d = 0.0015$ the complex clearance reduction no longer brings significant savings in pressure build-up length and drive power (cf. FIGS. 5 and 6).

EXAMPLE 6

In the following Example, the optimisation according to the invention which was found with the aid of the specified small screw extruder with moderately viscous silicon oils at room temperature, is applied to a very large screw extruder with a highly viscous plastic melt at considerably above 300° C.

A screw extruder having two intermeshing triple threaded screw shafts rotating in the same sense and having a housing internal diameter d of 162.4mm, an axial distance of the two screw shafts a of 146mm and a thread depth h of 16.5mm (measured from the screw thread base to the housing internal diameter), therefore having a ratio h/d of 0.1016, a radial screw clearance $\delta$ between screw crest and housing inner wall of 1.43mm, therefore a relative radial screw clearance $\delta/d$ of $8.8 \times 10^{-3}$ and having a clearance s of the two screw shafts in relation to one another, thus between the screw crest of one screw shaft and the screw thread base of the other screw shaft of 1.53 mm, thus having a relative clearance s/d of $9.42 \times 10^{-3}$ is intended at the end of a process to convey a polycarbonate melt at approximately 335° C. having a dynamic viscosity of 6,300 Poise at 300° C., at a mass flowrate of approximately 1000 kg/h at a screw shaft rotational speed n of approximately 160 rpm against a pressure differential $\Delta p$ of from 60 to 70 bars. A particularly important consideration is to keep the exit temperature of the melt out of the screw extruder as low as possible on account of the danger of a thermal damage of the product and in association therewith in the sense of the energy optimisation criterion to operate this pressure build-up section as favourably as possible with regard to energy, i.e. with the lowest drive power. In the following table the data for this optimisation example are compiled.

| Operating state No. | | 1 | 2 | 3 | 4 |
|---|---|---|---|---|---|
| screw pitch t | [mm] | 120 | 180 | 90 | 90 |
| pitch ratio t/d | | 0.739 | 1.108 | 0.554 | 0.554 |
| melt output | [kg/h] | 1010 | 1040 | 1020 | 1200 |
| screw rotational speed n(rpm) | | 158 | 160 | 162 | 173 |
| throughput coefficient q/nd³ | | 0.0249 | 0.0253 | 0.0245 | 0.0270 |
| pressure differential $\Delta p$ | [bar] | 69 | 67 | 59 | 67 |
| pressure build-up length L | [mm] | 465 | 610 | 310 | 370 |
| melt exit temperature | [°C.] | 370 | 378 | 362 | 366 |

The dimension-less throughput coeffcient $q/nd^3$ was formed with the melt density of 1.0 kg/dm³ present at these temperatures. The pressure differential $\Delta p$ and the pressure build-up length L were determined by means of a plurality of pressure measurement sensors inside the pressure build-up section. The melt exit temperature was very carefully determined by a number of measurements repeated at certain places and times. The local drive power of the pressure build-up section could not be measured but the melt exit temperature is a direct expression of the energy conditions.

With the data given above for $h/d = 0.1016$, $\delta/d = 8.8 \times 10^{-3}$ and $q/nd^3 = 0.025$ there results here with the aid of the above relationship f an optimum relative screw pitch $(t/d)_{opt}$ of 0.573, therefore an optimum screw pitch $t_{opt}$ of 93 mm. In operating state No. 3 the next available pitch to this was realised $t = 90$ mm $= 0.97 \cdot t_{opt}$, and under the measured operating states then also with 310 mm and 362° C. the smallest pressure build-up length and the lowest melt exit temperature were achieved. Thus in operating state No. 3 both from the geometrical and energy point of view, decisive improvements are achieved in comparison with operating state No. 2, namely the halving of the pressure build-up length and a melt exit temperature lower by 16° C.

In the fourth position is an operating state deviating somewhat from the three previous ones and having the here favourable 90 mm pitch. The throughput was increased to 1200 kg/h for which purpose the screw shaft rotational speed also has to be increased, nevertheless the pressure build-up length and exit temperature still remained the values of operating state No. 1 with the 120 mm pitch. Since the product tolerates a melt exit temperature of 370° C. as in operating state No. 1, but in operating state No. 4 using the solution according to the invention despite an increase of approximately 20% in throughout comes out less hot at 366° C, it is to be expected that the throughput can be increased beyond 1200 kg/h until again reaching the melt exit temperature of 370° C.

This example 6 is already contained in the initially mentioned patent application as Example 3. Yet it is an example in the sense of the present invention as the screw extruder used with its relative radial screw clearance $\delta/d$ of $8.8 \times 10^{-3}$ does not according to the new recognition fall into the range of validity $(2 \times 10^{-3} < \delta/d < 6 \times 10^{-3}$ see above) of the relationship $f(q/nd^3)$ from the prior patent application. According to the latter, without considering the influence of the clearance, for the present case $(t/d)_{opt}$ would be equal to 0.3438 and taking into account the thread depth influence already previously qualitatively indicated would have been 0.3661, thus $t_{opt}$ would be 60mm. As such a small screw pitch was not available the value $t = 90$ mm was then used, which according to the new knowledge in the case of the screw clearance here present is exactly correct (see above), and thus in operating states Nos. 3 and 4 in comparison with those previously used, much greater pitches of $t = 180$ and 120 mm the specified essential improvements were achieved. According to the present invention a screw pitch of $t = 60$ mm is here not optimum.

EXAMPLE 7

In the following Example the effect of the solution according to the invention for a double threaded two shaft screw extruder is shown. This is a theoretically derived Example.

With an intermeshing double threaded two shaft screw extruder rotating in the same sense having a housing internal diameter d of 32.0mm, an axial distance of the two screw shafts a of 25.6mm, a thread depth h of 6.6 mm (measured from the having thread base to the housing internal diameter), therefore having a ratio h/d of 0.206, a radial screw clearance $\delta$ between the screw crest and housing inner wall of 0.64 mm, therefore having a ratio $\delta/d$ of $20 \times 10^{-3}$ and having a clearance s of the two screw shafts from one another, therefore between the screw crest of one screw shaft and the screw thread base of the other screw shaft of 0.84mm, therefore having a ratio s/d of $26 \times 10^{-3}$, a polymer melt havng a viscosity $\eta$ of 500 Poise is to be pumped in a volume flow q of 23.6 l/h at a screw shaft rotational speed n of 150 rpm against a pressure differential Δp=10 bars. In this arrangement the screw extruder should work with the smallest pressure build-up length L and the smallest drive power P and thus be optimised in respect of geometry and energy.

The dimensionless throughput coefficient $q/nd^3$ here works out at 0.08. There follows from FIG. 2 or from the mathematical function f an optimum pitch ratio $(t/d)_{opt} =0.8$ for this operating state of the specified double threaded screw extruder, thus an optimum screw pitch of $t_{opt} =26$ mm. For the screw pitches t of 18, 27, 36 and 54 mm the relevant pressure-build-up length L and drive powers P are determined arithmetically:

| screw pitch | t[mm] | 18 | 27 | 36 | 54 |
|---|---|---|---|---|---|
| pressure build-up length | L [mm] | 260 | 210 | 240 | 310 |
| drive power | P [W] | 135 | 110 | 122 | 160 |

The table shows clearly the smallest numerical values for the pressure build-up length L and the drive power P at the optimum pitch t of approximately 27 mm. Other otherwise thoroughly conventional pitches result in up to 48% more pressure build-up length and up to 45% more drive power.

EXAMPLE 8

The pumping task mentioned in Example 7 is to be achieved with the double threaded two shaft screw extruder described in Example 7, but in this case also with simultaneous clearance optimisation. Let the smallest radial screw clearance to be produced with applicable effort be $\delta=0.13$ mm i.e. $\delta/d=4\times10^{-3}$, let s then be 0.33mm, i.e. $s/d=10\times10^{31\ 3}$.

From FIG. 2 or with the aid of the above relationship f there is now given an optimum relative screw pitch $(t/d)_{opt}$ of 0.6, thus an optimum screw pitch $t_{opt}$ of 19 mm. Calculation for the same set of screw pitches as in Example 7 gives the following results:

| Screw pitch | t [mm] | 18 | 27 | 36 | 54 |
|---|---|---|---|---|---|
| pressure build-up length | L [mm] | 120 | 150 | 175 | 240 |
| drive power | P [W] | 87 | 105 | 120 | 159 |

In comparison with Example 7 it becomes clear from the table firstly that the minimum values for L and P with the reduced clearance are now distinctly lower (L=120 mm against previously 210 mm, P=87W against previously 110W) and secondly are displaced to the lower pitch value 18 mm (Example 7:27mm). With the use of other non optimum pitches, up to 100% more pressure build-up length and up to 83% more drive power are required.

Examples 7 and 8 show clearly that the present invention offers considerable advantages in the case of double threaded screw extruders of the specified type as well.

I claim:

1. A multi-shaft screw extruder with screw shafts arranged intermeshing in pairs and rotating in the same sense in pairs of which each screw shaft of a pair has at least one double or triple threaded pressure build-up section corresponding to that of the other screw shaft, wherein at least part of the pressure build-up sections have a ratio of screw pitch t to housing internal diameter d which lies within the range of the following relationship:

$0.7 \cdot f(h/d, \delta/d, q/nd^3) < t/d < 1.8 \cdot f(h/d, \delta/d, q/nd^3)$, where q is the volumetric throughout of a screw pair, n is the screw shaft rotational speed, h is the thread depth, measured from the screw thread base to the housing inner wall and δ is the radial screw clearance between the screw crest and the housing inner wall and in which:

$$f(\frac{h}{d}, \frac{\delta}{d}, \frac{q}{nd^3}) = \frac{A}{\frac{h}{d}} \cdot \left[a + b \cdot \frac{q}{nd^3} + c \cdot (\frac{q}{nd^3})^2\right]$$

and $a = a_0 + b_0 \cdot (\delta/d) + c_0 \cdot (\delta/d)^2 + d_0 \cdot (\delta/d)^3$ $b = a_1 + b_1 \cdot (\delta/d) + c_1 \cdot (\delta/d)^2 + d_1 \cdot (\delta/d)^3$ $c = a_2 + b_2 \cdot (\delta/d) + c_2 \cdot (\delta/d)^2 + d_2 \cdot (\delta/d)^3$ in which in the case of triple threaded pressure build-up sections $A = 0.1082$

| | | | |
|---|---|---|---|
| $a_0 = 0.18173$ | $b_0 = -9.9396$ | $c_0 = 3926.6$ | $d_0 = -122\ 604$ |
| $a_1 = 8.2230$ | $b_1 = 170.46$ | $c_1 = -10\ 833$ | $d_1 = 219\ 048$ |
| $a_2 = -4.8033$ | $b_2 = 1053.6$ | $c_2 = -80\ 154$ | $d_2 = 1\ 793\ 827$ | and in which in the case of double threaded pressure build-up sections $A = 0.206$

| | | | |
|---|---|---|---|
| $a_0 = 0.18175$ | $b_0 = -4.970$ | $c_0 = 981.65$ | $d_0 = -15\ 325$ |
| $a_1 = 5.1394$ | $b_1 = 53.267$ | $c_1 = -1692.6$ | $d_1 = 17\ 113$ |
| $a_2 = -1.8763$ | $b_2 = 205.78$ | $c_2 = -7827.6$ | $d_2 = 87\ 589$ | and where the following relations are valid: $f(h/d, \delta/d, q/nd^3) < 2.0$; $q/nd^3 > 0.01$; $0.0015 < \delta/d < 0.02$; and $0.06 < (h/d)$ triple threaded $< 0.13\ 1$ and $0.11 < (h/d)$ double threaded $< 0.29$.

2. A multi-shaft screw extruder accordng to claim 1, wherein at least part of the pressure build-up sections have the smallest relative radial screw clearance δ/d permitted by the accuracy of manufacturing technology and the materials between the screw crest and housing inner wall, but being greater than 0.0015 and the smallest permissible relative clearance s/d of the two screw shafts of a screw shaft pair in relation to one another, but being greater than 0.003, in each case relative to the housing internal diameter d.

* * * * *

UNITED STATES PATENT AND TRADEMARK OFFICE
CERTIFICATE OF CORRECTION

PATENT NO. : 4,162,854
DATED : July 31, 1979
INVENTOR(S) : Martin Ullrich

It is certified that error appears in the above-identified patent and that said Letters Patent are hereby corrected as shown below:

Abstract, in the formula "...q/nd" should --...$q/nd^3$--.

Col. 1, line 34, "srew" should be --screw--.

Col. 1, line 53, "prssure" should be --pressure--.

Col. 1, line 66, insert "-" before "7827.6".

Col. 2, line 2, insert "and" after "0.02;"

Col. 2, line 10, insert "d" after "$\delta/$".

Col. 2, line 35, "hosing" should be --housing--.

Col. 3, line 50, insert "the" before "smallest".

Col. 4, line 54, "P[mm]" should be --P[W]--.

Col. 4, line 52, "60" first occurrence should be --45--.

Col. 5, line 16, "not" should be --now--.

Col. 6, line 49, "driver" should be --drive--.

Col. 7, line 51, "throughout" should be --throughput--.

Col. 8, line 20, "throughout" should be --throughput--.

Col. 8, line 57, delete "having" before "thread", and insert --screw--.

Col. 9, line 34, "$10^{31\ 3}$" should be --$10^{-3}$--.

UNITED STATES PATENT AND TRADEMARK OFFICE
CERTIFICATE OF CORRECTION

PATENT NO. : 4,162,854

DATED : July 31, 1979

INVENTOR(S) : Martin Ullrich

It is certified that error appears in the above—identified patent and that said Letters Patent are hereby corrected as shown below:

Col. 10, line 11, "throughout" should be --throughput--.

Col. 10, line 24, "67" should be -- $\delta$ --.

Col. 10, line 49, "accordng" should be --according--.

Signed and Sealed this

Twentieth Day of November 1979

[SEAL]

Attest:

RUTH C. MASON
Attesting Officer

LUTRELLE F. PARKER
Acting Commissioner of Patents and Trademarks